United States Patent Office
3,414,749
Patented Dec. 3, 1968

3,414,749
COOLING AND SECURING MOTOR
LAMINATIONS
Karl Abegg, Oberreiden, Switzerland, assignor to Maschinenfabrik Oerlikon, Zurich, Switzerland
Filed Mar. 29, 1965, Ser. No. 443,395
Claims priority, application Switzerland, Apr. 1, 1964, 4,261/64
5 Claims. (Cl. 310—52)

ABSTRACT OF THE DISCLOSURE

An electric motor construction comprises a surrounding outer housing wall, a bundle of laminations within the wall at a spaced location from the interior thereof and rod members extending through the laminations and secured directly to the housing wall for securing the laminations in position within the motor housing. The rod members are constructed as tubes and a liquid coolant is circulated through the cooling conduits defined by these tubes. The rod members are also coated with a material of high thermal conductivity, for instance resin.

---

Figure 1:
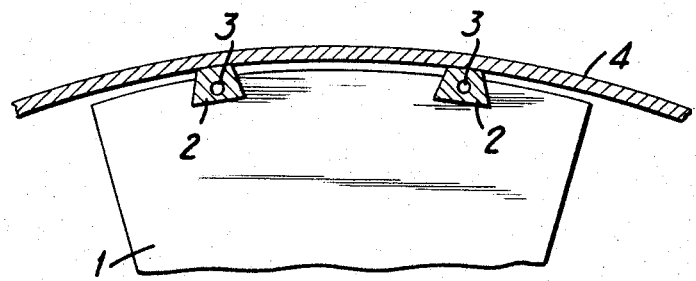

This invention relates in general to the construction of electric motors and, in particular, to a new and useful electric motor construction having fastening elements for a bundle of laminations for a rotor or stator which are provided with liquid cooling conduits.

At the present time, it is known to provide for the cooling of laminations in electrical machines by including a radial or axial guide for the cooling in the laminations. In order to keep the machine length as small as possible, it is desirable, however, to make the bundles of laminations without such radial slots. On the other hand, axially directed air or gas-cooling requires an increase of the radial dimensions of the bundles of laminations, since relatively large channel cross sections are required for the coolant. It has therefore been suggested to arrange liquid cooling tubes of non-magnetizable material and with a high specific resistance in holes which are drilled in the bundles of laminations. In order to facilitate the stacking of the laminations, the cooling tubes are inserted only after the laminations have been assembled. This requires a clearance of several tenths of a millimeter which cannot be eliminated after the assembly of the tubes and which leads to a reduction of the cooling effect. Since the tubes must be driven into the openings provided in the laminations, there is a danger that the insulation of the laminations will be damaged and especially on the small dimensional sides and this can lead to surface conduction and scorching if bright cooling tubes are used. In order to prevent this, the cooling tubes must be surrounded with a jacket of insulation material, which, in turn, increases the heat resistance considerably.

In accordance with the present invention, the disadvantages of the prior art are overcome by providing a supporting device for the laminations which effectively secures the laminations together and to a support and provides a channel for a liquid coolant. With such an arrangement, the bundle of laminations can be assembled in the same manner as the conventional air or gas-cooled laminations and fastening elements are provided for interconnecting preferably the end portions thereof and for securing the elements in position in the motor housing which, in accordance with the invention, are provided with cooling channels for a liquid coolant.

Accordingly, it is an object of the invention to provide a motor construction including a supporting device for a stack of laminations having a liquid coolant channel defined therethrough.

A further object of the invention is to provide an electric motor construction which includes a stack of laminations for securing member connected through slotted end portions of the stack to hold the stack together and, which includes a channel defined therein for the passage of a liquid coolant therethrough.

A further object of the invention is to provide a motor construction having means for adequately cooling laminations thereof and which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 2:
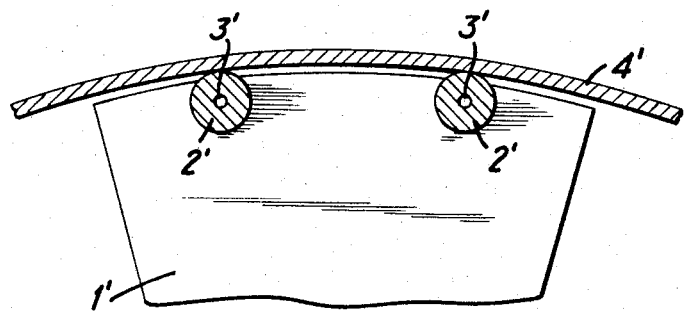

In the drawings:

FIG. 1 is a somewhat schematic side elevational view of a stator having a stack of laminations which are secured in position in accordance with the invention; and, FIG. 2 is a view similar to FIG. 1 of another embodiment of the invention.

In FIG. 1, in accordance with the invention, there is provided a lamination stack or bundle segment 1 made up of a plurality or stack of laminations for a stator of an electric motor. The stack of laminations is secured together by fastening elements such as by dove-tailed bar or securing rods 2 which extend through similarly-shaped recess defined through each segment of the bundle. In accordance with the invention, the dove-tailed bars 2 are provided with a through conduit or bore 3 through which a liquid coolant preferably water is directed. All constructional features which are not absolutely necessary for the understanding of the invention, for example, the gearing and the overlapping of the individual segment elements in the stack 1 have not been shown for clarity of illustration purposes. The dove-tailed elements 2 are secured to the stator housing 4 in a known manner.

In FIG. 2 there is indicated a bundle or stack of laminations 1' in segment form which are secured together by cylindrical fastening elements or rod members 2' which also function to secure the segment bundles or stacks 1' to the housing 4'. In this embodiment, as in FIG. 1, the fastening elements 2' are provided with conduits or bores 3' for the flow of a coolant therethrough. In each embodiment, the coolant is advantageously a liquid coolant which is circulated through the conduits 3 and 3'.

The liquid-cooled bundle of laminations 1 and 1' in the embodiments illustrated can be assembled in the same manner as the conventional air or gas-cooled laminations. Since the fastening elements 2 and 2' are arranged principally outside the magnetic flux, the eddy current losses will remain negligibly small. Particularly during the stacking of the laminations, materials of higher thermal conductivity are preferably arranged between the fastening elements 2 or 2' and the laminations 1 or 1', respectively. This can be achieved, for example, by coating the elements 2 or 2' with a hardening resin. In this way, it is possible to eliminate air layers which have a high thermal resistance.

Each of the figures of the drawings relates to a bundle of stator laminations assembled from segments. The invention is equally applicable to bundles whose individual laminations or elements consist of rings. The fastening elements provided with the cooling channels, can also be provided with advantage in the rotor laminations.

While specific embodiments of the invention have been shown and described in detail to illustrate the application

What is claimed is:

1. An electric motor construction comprising an exterior housing wall, a bundle of laminations arranged within said housing wall and spaced inwardly therefrom, a tubular rod member for securing said laminations in position arranged in abutting contact with said housing wall along a major portion of its length, and supportably interengaged with each of said laminations in said bundle, and a cooling fluid channel defined through said rod member.

2. An electric motor construction according to claim 1, wherein said rod member is coated with a material of high thermal conductivity.

3. An electric motor construction according to claim 1, wherein laminations are slotted adjacent their outer peripheries, said rod member extending through the slots of said laminations at a location outside the major area of magnetic flux.

4. An electric motor construction according to claim 1, wherein said rod member is of dove-tail configuration and engages in a dove-tail cut-out portion of said laminations.

5. An electric motor construction according to claim 1, wherein said rod member is of a cylindrical configuration and engages a cylindrical cut-out portion of said laminations.

References Cited

UNITED STATES PATENTS

| | | | |
|---|---|---|---|
| 1,477,773 | 12/1923 | Schou | 310—217 X |
| 1,685,054 | 9/1928 | Hibbard | 310—217 X |
| 2,761,078 | 8/1956 | McAdam | 310—217 X |

J. D. MILLER, *Primary Examiner.*

R. W. TEMPLETON, *Assistant Examiner.*